US010143050B2

(12) United States Patent
Nieuwlands

(10) Patent No.: US 10,143,050 B2
(45) Date of Patent: Nov. 27, 2018

(54) LED DRIVER, LIGHTING SYSTEM USING THE DRIVER AND DRIVING METHOD

(71) Applicant: PHILIPS LIGHTING HOLDING B.V., Eindhoven (NL)

(72) Inventor: Eric Johannus Hendricus Cornelis Maria Nieuwlands, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/322,394

(22) PCT Filed: Jun. 25, 2015

(86) PCT No.: PCT/EP2015/064426
§ 371 (c)(1),
(2) Date: Dec. 27, 2016

(87) PCT Pub. No.: WO2016/001065
PCT Pub. Date: Jan. 7, 2016

(65) Prior Publication Data
US 2017/0164441 A1 Jun. 8, 2017

(30) Foreign Application Priority Data
Jul. 1, 2014 (EP) ..................................... 14175240

(51) Int. Cl.
H05B 37/02 (2006.01)
H05B 33/08 (2006.01)
(52) U.S. Cl.
CPC ..... *H05B 33/0845* (2013.01); *H05B 37/0272* (2013.01); *H05B 37/0281* (2013.01)

(58) Field of Classification Search
CPC ............ H05B 33/0845; H05B 37/0272; H05B 37/0281
USPC ......................................................... 315/307
See application file for complete search history.

(56) References Cited

U.S. PATENT DOCUMENTS

| 6,761,470 | B2 | 7/2004 | Sid | |
|---|---|---|---|---|
| 8,373,355 | B2* | 2/2013 | Hoover | H05B 33/0845 315/291 |
| 2006/0170370 | A1 | 8/2006 | De Anna | |
| 2010/0188006 | A1 | 7/2010 | Young | |
| 2011/0043129 | A1 | 2/2011 | Koolen | |
| 2011/0068689 | A1 | 3/2011 | Scenini et al. | |
| 2012/0235579 | A1* | 9/2012 | Chemel | F21S 2/005 315/152 |

(Continued)

FOREIGN PATENT DOCUMENTS

| EP | 2051235 A2 | 4/2009 |
|---|---|---|
| JP | 2005071770 A | 3/2005 |

(Continued)

*Primary Examiner* — Don Le
(74) *Attorney, Agent, or Firm* — Akarsh P. Belagodu

(57) ABSTRACT

A lighting controller and a control method make use of a fade time over which the light source is to be controlled when adjusting the light source output from a first dimming level to a second dimming level. The fade time is selected in dependence on both the difference between the first and second dimming values and the absolute values of the first and second dimming levels. This enables smooth fading over a long time when desired for a high quality fading with no flicker, or rapid fading between brightness levels when the speed of response is more important.

15 Claims, 6 Drawing Sheets

(56) References Cited

U.S. PATENT DOCUMENTS

| | | | |
|---|---|---|---|
| 2012/0249013 A1 | 10/2012 | Valois et al. | |
| 2012/0286681 A1* | 11/2012 | Hausman, Jr. | H05B 41/2828 315/200 R |
| 2014/0375216 A1* | 12/2014 | Seidmann | H05B 33/0845 315/149 |
| 2015/0084541 A1* | 3/2015 | Jung | H05B 33/0812 315/291 |

FOREIGN PATENT DOCUMENTS

| | | |
|---|---|---|
| WO | WO2006074299 A2 | 7/2006 |
| WO | WO2008060842 A2 | 5/2008 |
| WO | WO2008070981 A1 | 6/2008 |
| WO | WO2012154639 A1 | 11/2012 |
| WO | WO2013102854 A1 | 7/2013 |

* cited by examiner

| | 0 | 16 | 32 | 48 | 64 | 80 | 96 | 112 | 128 | 144 | 160 | 176 | 192 | 208 | 224 | 240 |
|---|---|---|---|---|---|---|---|---|---|---|---|---|---|---|---|---|
| 0 | 100 | 77 | 57 | 39 | 23 | 10 | 10 | 10 | 10 | 10 | 10 | 10 | 10 | 10 | 10 | 10 |
| 16 | 82 | 94 | 73 | 54 | 37 | 22 | 10 | 10 | 10 | 10 | 10 | 10 | 10 | 10 | 10 | 10 |
| 32 | 64 | 77 | 89 | 68 | 50 | 35 | 21 | 10 | 10 | 10 | 10 | 10 | 10 | 10 | 10 | 10 |
| 48 | 46 | 61 | 73 | 83 | 64 | 47 | 32 | 20 | 10 | 10 | 10 | 10 | 10 | 10 | 10 | 10 |
| 64 | 28 | 44 | 57 | 68 | 77 | 59 | 44 | 30 | 19 | 10 | 10 | 10 | 10 | 10 | 10 | 10 |
| 80 | 10 | 27 | 41 | 54 | 64 | 72 | 55 | 40 | 28 | 18 | 10 | 10 | 10 | 10 | 10 | 10 |
| 96 | 10 | 10 | 26 | 39 | 50 | 59 | 66 | 50 | 37 | 26 | 17 | 10 | 10 | 10 | 10 | 10 |
| 112 | 10 | 10 | 10 | 25 | 37 | 47 | 55 | 60 | 46 | 34 | 23 | 16 | 10 | 10 | 10 | 10 |
| 128 | 10 | 10 | 10 | 10 | 23 | 35 | 44 | 50 | 55 | 41 | 30 | 21 | 14 | 10 | 10 | 10 |
| 144 | 10 | 10 | 10 | 10 | 10 | 22 | 32 | 40 | 46 | 49 | 37 | 27 | 19 | 13 | 10 | 10 |
| 160 | 10 | 10 | 10 | 10 | 10 | 10 | 21 | 30 | 37 | 41 | 44 | 32 | 23 | 17 | 12 | 10 |
| 176 | 10 | 10 | 10 | 10 | 10 | 10 | 10 | 20 | 28 | 34 | 37 | 38 | 28 | 20 | 14 | 11 |
| 192 | 10 | 10 | 10 | 10 | 10 | 10 | 10 | 10 | 19 | 26 | 30 | 32 | 32 | 23 | 17 | 12 |
| 208 | 10 | 10 | 10 | 10 | 10 | 10 | 10 | 10 | 10 | 18 | 23 | 27 | 28 | 27 | 19 | 13 |
| 224 | 10 | 10 | 10 | 10 | 10 | 10 | 10 | 10 | 10 | 10 | 17 | 21 | 23 | 23 | 21 | 14 |
| 240 | 10 | 10 | 10 | 10 | 10 | 10 | 10 | 10 | 10 | 10 | 10 | 16 | 19 | 20 | 19 | 15 |

FIG. 1

LED DRIVER, LIGHTING SYSTEM USING THE DRIVER AND DRIVING METHOD

CROSS-REFERENCE TO PRIOR APPLICATIONS

This application is the U.S. National Phase application under 35 U.S.C. § 371 of International Application No. PCT/EP2015/064426, filed on Jun. 25, 2015, which claims the benefit of European Patent Application No. 14175240.2, filed on Jul. 1, 2014. These applications are hereby incorporated by reference herein.

FIELD OF THE INVENTION

The invention relates to dimmable LED drivers.

BACKGROUND OF THE INVENTION

Most dimmable LED drivers have a linear dimming curve. Typically the dimming level is coded over 8 bits. The human eye response is however essentially non-linear. Therefore, steps in the lowest values are perceived much more strongly than steps in highest values. The fast response of LEDs does not intrinsically smoothen the perception of the steps.

To prevent visible steps, some drivers add a fade between the steps. This is needed for the lower level steps, but not for the higher levels. Most of the time a fade time value is selected that is a compromise between a change in brightness that is fast enough and steps which cannot be perceived. For example, a fade period may have a duration of the order of 30 ms to 100 ms.

The fade function between dimming levels aims to mimic tungsten sources.

The fade function operates with a fixed time constant, resulting in a slower behavior of the light output under certain dimming change conditions. For example, the dimming level may be set every 20 ms for a 50 Hz system. If a total fade period of 100 ms is provided, the difference between the new dimming level and the old dimming level can be divided by 5, to provide 5 equal step changes in dimming level over the total 100 ms time period allocated to a change in brightness.

US 2011/0068689 discloses a dimming control system, in which it is recognized that more gradual changes in brightness are desired at lower brightness levels than at higher brightness levels. Thus, within a fixed time period over which the dimming level is changed, the brightness follows an exponential curve between a low and a high brightness. The exponential curve is approximated by segments corresponding to a sampling rate (e.g. 25 Hz). The fixed time period may have one value for a brightness increase and a different value for a brightness decrease.

The use of a fixed time period means the response may be too slow in some situations and not slow enough in others.

SUMMARY OF THE INVENTION

The invention is defined by the claims.

According to an aspect of the invention, there is provided a controller for controlling a dimmable light source, wherein the controller comprises an input for receiving a second dimming level, which is different to a first dimming level to which the light source is set and an output for providing control commands to the light source to control the brightness level over time, wherein the controller is adapted to:

set a fade time over which the light source is to be controlled to adjust the light source output from the first dimming level to the second dimming level, wherein the fade time is selected in dependence on both the difference between the first and second dimming levels and the absolute value of at least one of the first and second dimming levels; and control the light source to adjust the dimming level over the course of the set fade time.

The invention provides adaptation of the fade time to the actual dimming input changes. For example, a longer fade time may be used when the new input value is only a few values away from the previous one. This indicates that the user is making small adjustments to the dimming level and therefore is paying attention to the light output, and would like to see a smooth transition in the light output. A longer fade time can also be used when the dimming levels (or at least the new dimming level) are at the lower brightness range, since the changes in brightness will then be most perceptible to the user.

Thus, smoother transitions can be observed at low brightness levels and for small changes, whereas a snappier response can be observed for larger changes, where the user is not expecting a gradual change in brightness, for example for instructions to switch from off (or nearly off) to fully on (or nearly fully on).

In this way, the invention provides more intelligent control of a dimming function. The compromise between fast response and desired smooth transitions is resolved to enable vary fast dynamics when desired as well as very smooth slow fades, for example in respect of low brightness levels.

The controller is for example adapted to divide the fade time into a set of fixed time duration segments, and to set dimming levels for each segment. These segments may correspond to the frequency of the internal control signals applied to the driver, and these are typically at a higher frequency than the maximum frequency of the input signal. The input signal may for example be updated at most every 20 ms, corresponding to the period defined by a 50 Hz mains signal. The internal control signals may instead enable updated driving of the light source every 5 to 10 ms.

The dimming levels within the segment may be selected to vary:

linearly over the fade time; or non-linearly over the fade time with slower rate of change at lower dimming levels.

A linear control is simpler to implement, with the change in dimming level simply divided into the number of time segments available within the set fade time. A non-linear approach can instead provide more gradual change at lower brightness levels.

The controller may be adapted to set a minimum value of the fade time, wherein the minimum fade time is set if the difference between the first and second dimming levels exceeds a threshold. This threshold represents an abrupt change in brightness demanded by the user, and it can then be assumed that the user is not concerned with a smooth brightness transition.

The controller may be adapted to set the fade time above the minimum fade time by an amount which depends on the second dimming level and the difference between the first and second dimming levels. The fade time is thus varied in an intelligent way to provide dimming perceived as smooth.

The controller may be for controlling a dimmable solid state light source.

An aspect of the invention also provides a lighting system, comprising:
an LED luminaire; and
a controller of the invention.

An aspect of the invention also provides a method of controlling a dimmable light source, wherein the light source is set to a first dimming level, the method comprising:
receiving a second dimming level, which is different to the first dimming level;
setting a fade time over which the light source is to be controlled to adjust the light source output from the first dimming level to the second dimming level, wherein the fade time is selected in dependence on both the difference between the first and second dimming levels and the absolute value of at least one of the first and second dimming levels; and
controlling the light source to adjust the dimming level over the course of the set fade time.

BRIEF DESCRIPTION OF THE DRAWINGS

Examples of the invention will now be described in detail with reference to the accompanying drawings, in which:

FIG. 1 shows a table which illustrates one implementation of a method for setting fading times between changes in dimming level;

DETAILED DESCRIPTION OF THE EMBODIMENTS

Figure 2:
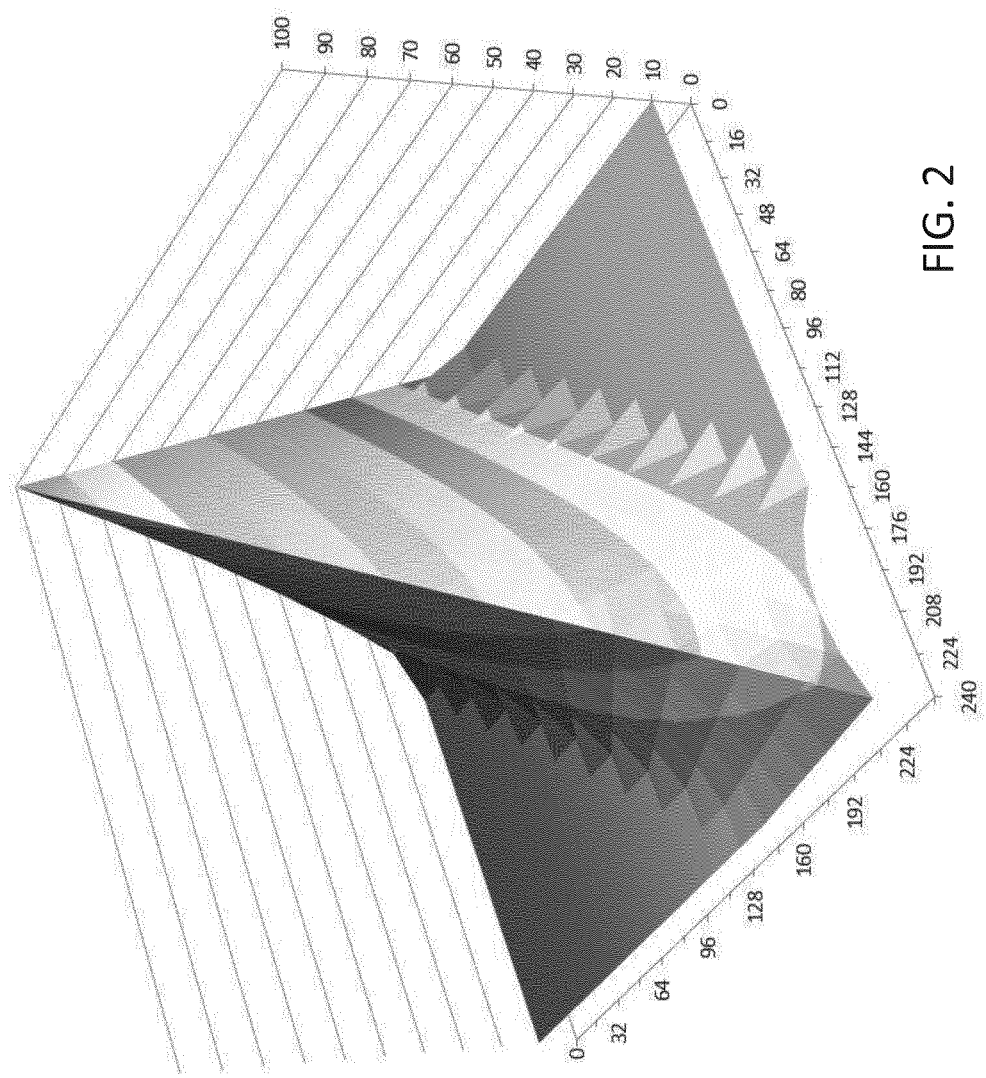
FIG. 2 illustrates graphically a first implementation of a method for setting fading times between changes in dimming level.

The invention provides a lighting controller and a control method in which a fade time is set over which the light source is to be controlled to adjust the light source output from a first dimming level to a second dimming level. The fade time is selected in dependence on both the difference between the first and second dimming levels and the absolute values of the first and second dimming levels. This enables smooth fading over a long time when desired for a high quality fading with no flicker, or rapid fading between brightness levels when the speed of response is more important.

The invention is of particular interest for solid state lighting such as LED lighting, because the response time is so rapid that step changes in brightness can be perceived. A basic LED driver translates a requested brightness value, for example as set by a user, to a particular current to drive the LEDs according to the requested level. Typically, pulse width modulation (PWM) is used to control the LEDs, although analogue current dimming may also be employed.

Various protocols exist for the interfacing with an LED the such as DMX, sACN and ArtNet. In the DMX system, the desired output brightness is typically linearly converted into the output control current. The input value typically is encoded as 8 bits (256 levels). Thus, a value of 128 is translated into a 50% duty cycle of the pulse width modulation system, or a 50% current level in the case of analogue current dimming.

The human eye does not respond in a linear way, so that steps in the lower brightness values are perceived much more strongly than steps in the higher brightness levels. For example, a step from 1% to 2% brightness is seen very clearly whereas a step from 80% to 90% brightness is more difficult to perceive. A change from 1%-2% is a doubling of the light level, whereas 80%-90% is a much smaller relative step.

Dimming is traditionally carried out in a linear manner. In the past, with very slow tungsten sources, this has never been a problem. New solid state light sources can change light level almost instantaneously and this enables much stronger lighting effects, but also it gives rise to visibility between the steps at different brightness levels, so that dimming control is not seen as being as smooth as for tungsten sources.

To solve this problem it is known to mimic tungsten sources by adding a fade between levels. This helps to prevent visible steps, but also makes the behaviour slow.

This invention is based on the recognition that a fade time period is needed more for low brightness levels where the perception by the human eye is greater, and for small changes in dimming level because the user is then making a fine selection of brightness and likely to be concentrating on the light output level.

By analysing the change in brightness level instructed to the system, and departing from a fixed fade time period, the system can respond in a more intelligent way. In particular, if a new dimming level is received, and this value is only a few values away from the previous value, a longer fade time can be used. If the new (and/or old) value is in the low brightness range, a longer fade time can also be used.

A minimum fade time may be set so that immediate changes in brightness are avoided, and a maximum fade time may be set to ensure sufficiently rapid response of the system. For example a maximum fade time may be 100 ms and a minimum fade time may be 10 ms.

Some examples of changes in dimming level and possible fade times are given below, where the dimming value ranges from 0 (lighting off) to 255 (lighting at full brightness):

Previous value is 1, new Value is 0: fade time is 100 ms.

This gives a slow adaptation of the brightness level because the brightness levels are low.

Previous value is 10, new value is 9: fade time is around 90 ms.

This gives a slow adaptation but with a slightly reduced fade time possible because the brightness levels are higher.

Previous value is 1, new value is 5: fade time is around 95 ms.

This gives a slow adaptation due to the low brightness levels but with a slightly reduced fade time possible because the user is requesting a large change in brightness so will tolerate some flicker.

Previous value is 200, new Value is 0: fade time is 10 ms.

This gives a rapid adaptation because the command is from nearly full on to off.

Previous value is 255, new Value is 252: fade time is 10 ms.

This gives a rapid adaptation because the changes will not be perceived by the user.

The concepts adopted in the examples above can be implemented as an algorithm which takes account of the difference between the first and second dimming levels and the absolute values of the first and second dimming levels.

One example of a possible formula to set the fading time "FadeTime" is:

$$F1 = (255-Vs) / 255$$
$$\text{IF}(\text{ABS}(Vp-Vs)) < T \text{ THEN } F2=(T - \text{ABS}(Vp-Vs))/ T$$
$$\text{ELSE } F2= 0$$
$$\text{FadeTime} = \text{Fade}_{Min} + F1 * F2 * (\text{Fade}_{Max} - \text{Fade}_{Min})$$

In these equations:
F1=Factor 1 which implements the concept of more fading for lower values.
F2=Factor 2 which implements the concept of more fading time for smaller step-size.
T=Threshold for the step size. For a step size above this threshold value, a minimum fading time is applied.
Vp=Previous dimming value.
Vs=New dimming value
$\text{Fade}_{Min}$=Minimal Fade Time
$\text{Fade}_{Max}$=Maximum Fade Time It can be seen that the factor F2 only allows the fade time to be increased above the minimum value $\text{Fade}_{Min}$ if the change (Vp−Vs) is below the threshold. If there is indeed a small threshold, the multiplier provided by F2 approaches 1 for no change in dimming value and 0 for a change in dimming value which is at the threshold.

The factor F1 scales the added fade time (additional to the minimum fade time) in dependence on how close the new dimming value is to the maximum brightness which is level 255 in this example. Thus for a new dimming value at maximum brightness, the value F1=0 so that the minimum fade time is set. The closer the new dimming value is to zero brightness, the greater the added part of the fade time can be.

FIG. 1 shows the fade time values for changes from one dimming value (along the y-axis) to a new dimming value (along the x-axis).

For these calculations, T=80, $\text{Fade}_{Min}$=10 and $\text{Fade}_{Max}$=100.

The table shows that far from the diagonal (top left to bottom right) where there are large changes in brightness, the minimum fade time is applied. Close to the diagonal, the fade time decreases with increasing brightness of the dimming values.

FIG. 2 illustrates the table in a graphical way, showing on the old and new dimming values on the two horizontal axes and the resulting fade time on the vertical axis.

Figure 3:
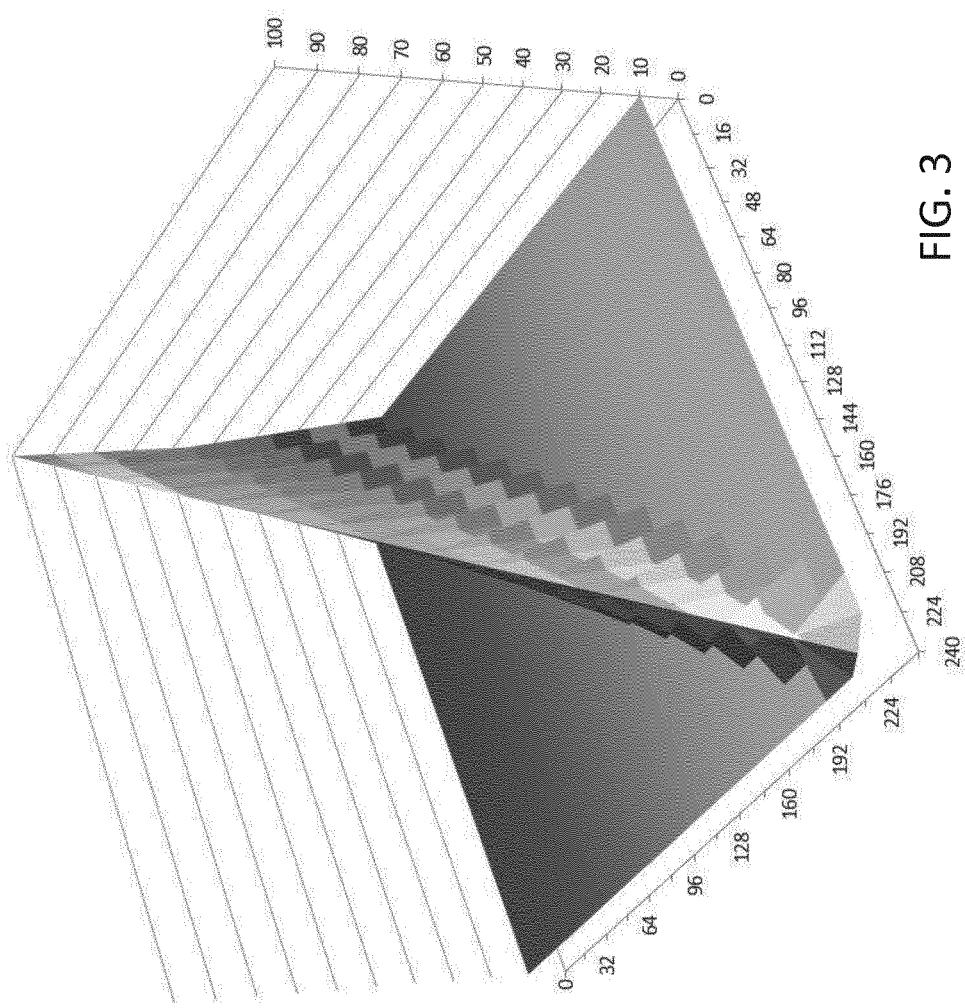
FIG. 3 illustrates graphically a second implementation of a method for setting fading times between changes in dimming level.

Different profiles are obtained with different parameters. For example, FIG. 3 shows the graphical result for T=10, $\text{Fade}_{Min}$=10 and $\text{Fade}_{Max}$=100.

Figure 4:
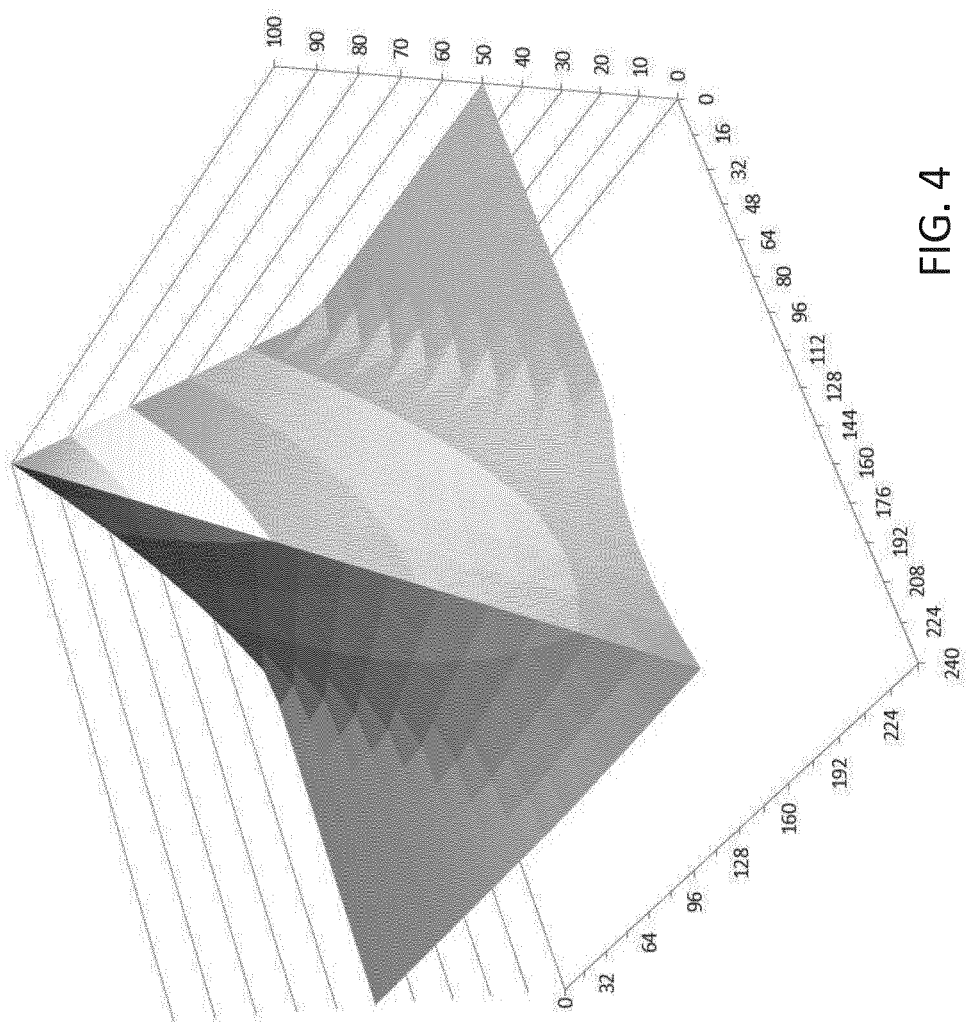
FIG. 4 illustrates graphically a third implementation of a method for setting fading times between changes in dimming level.

FIG. 4 shows the graphical result for T=80, $\text{Fade}_{Min}$=50 and $\text{Fade}_{Max}$=100.

Figure 5:
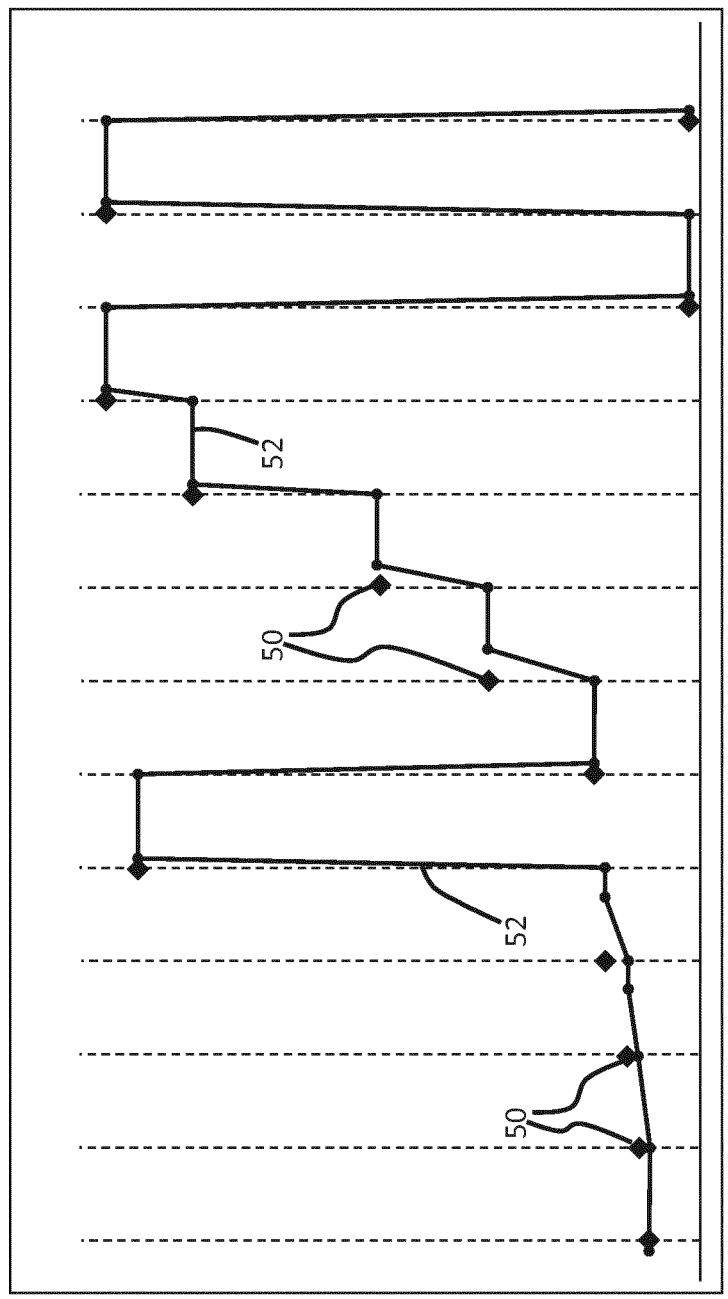
FIG. 5 shows how the brightness level is controlled over time.

FIG. 5 shows the behaviour of the system as a graph of the dimming values (discrete points 50) and the way the brightness is controlled (plot 52).

A smooth gradual change in the brightness level can be seen at low brightness values and when there are small changes, whereas more abrupt light output changes are made in response to large step changes in dimming value.

To implement the gradual change in brightness level over the fade time, the controller divides the fade time into a set of fixed time duration segments, and dimming levels are set for each segment.

The dimming levels for the segments are set internally rather than by the external input. The internal inputs to the LED driver have a higher resolution and can be updated more frequently than the input signal. For example, although the input to the system may be an 8 bit signal, the internal output resolution may be in the range 10 to 16 bits, and the update period may for example be in the range 5 ms to 10 ms. For a 10 bit internal resolution there are 4 different output levels that can be applied for each value of an 8 bit input signal. This enables a smoothly dimmed output to be generated. A 16 bit internal resolution allows 256 levels for each external input value.

The increased speed also enables the smooth dimming to be applied within one or a few periods of the input signal, which may for example update at most with a period in the range 20 to 50 ms.

The fixed time duration segments thus correspond to the internal update period of the driver circuitry. For example, the fade time may be divided into 5 ms segments. In this case, the example of a minimum fade time of 10 ms corresponds to one additional internal brightness level (after 5 ms) between the two levels received as external input to the system. For the maximum fade time of 100 ms, there is the option for 20 intermediate levels to provide a smooth change in brightness.

At the limit, the minimum fade time may correspond to the minimum time between internal control signals, for example they may both be 10 ms, so that there are no intermediate output drive levels. Alternatively, the minimum fade time may be a multiple of the minimum time between internal control signals, for example 2 to 5 times. For example, a 10 ms minimum fade time is 2 times a 5 ms minimum time between internal control signals, allowing one intermediate drive level.

A linear ramp in brightness may be provided from the starting dimming value to the end dimming value over the fade time. Alternatively, the dimming levels within the segments can instead vary non-linearly over the fade time with slower rate of change at lower dimming levels.

The example above is based on an algorithm which sets the fade time based on the old and new dimming values as input. The same function can of course be implemented by a look up table.

Controlling lighting systems is typically performed by the use of a remotely positioned light management system or console which outputs a suitable lighting control protocol to the controller(s) associated with the lights. For example, Digital Multiplex (DMX) (also known as DMX512) is a control standard which is mainly used in theatre and concert lighting systems. Remote Device Management (RDM) is a protocol enhancement to DMX that allows bi-directional communication between a device (e.g. light) management system and attached RDM compliant devices over a standard DMX line. RDM allows configuration, status monitoring, and management of devices in such a way that does not disturb the normal operation of standard DMX devices that do not recognize the RDM protocol. Art-Net is a protocol for transmitting the control protocol DMX (and with RDM) over the User Datagram Protocol of the Internet Protocol suite. In other words Art-Net is an Ethernet/IP version of DMX, in which multiple DMX universes can be controlled over a standard Ethernet network.

A possible extension to the system above is to measure the update frequency of the input signal. A DMX input might be updated at 30 Hz, giving 33 ms between different levels. Some DMX sources might expect Tungsten luminaires and only update at 10 Hz, which is good enough for tungsten but is too slow for LED luminaires.

Thus, the controller may determine an update frequency of the dimming level signal received as input, and may adapt the fade time in dependence on the update frequency. By measuring the update rate of the input to the driver, it is possible to change the minimum fade time that matches update frequency of the input, to prevent visible artefact in smooth fades.

The invention can be applied to all solid state lighting systems, such as LED luminaires, to provide smooth transitions in lower brightness levels and small steps and provide a quick response for larger steps.

In very high brightness luminaires, the steps in the low brightness levels are much more perceptible, but this is also the case in medium brightness luminaires that are used for general lighting.

Figure 6:
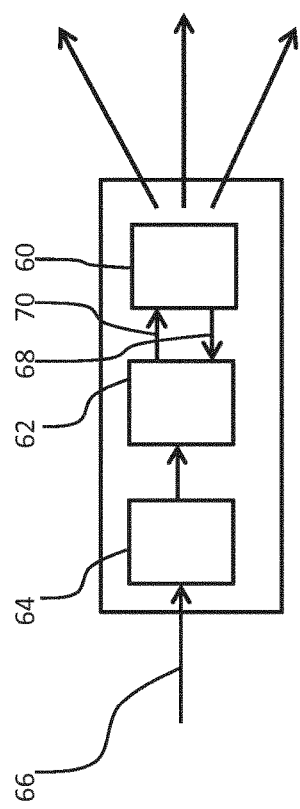
FIG. 6 shows an example of system of the invention.

FIG. 6 shows a lighting system, comprising an LED luminaire 60, an LED driver 62 and a controller 64 for implementing the method explained above. The controller receives an input 66 which specifies a desired dimming level. This may come from a user, or it may come from an automated system which adapts the lighting according to a pre-set timed schedule or according to sensed conditions, such as ambient lighting levels, weather conditions etc. The input may be provided wirelessly to the luminaire for example using the Zigbee protocol. Alternatively, the input may be provided over a wired link.

The controller 64 uses this dimming value as well as the previous value (which either it has stored in memory or it receives from the driver as shown by arrow 68), and it instructs the driver 60 accordingly as shown by arrow 70.

As explained above, the controller 64 has an internal resolution and update speed greater than the input signal. It is conventional for the internal resolution to be higher than the input signal. This is for example used to be able to adjust the different output levels in the factory. For example, a mapping may be desired which maps all of the possible 256 input steps to fit to an output range between 0% and 90%. It is also known to use this higher resolution to implement different dimming curves, such as in the digital addressable lighting interface "DALI" system, which has a nonlinear input/output relation during dimming. This extra resolution is also used in known systems having a fixed fade time.

Figure 7:
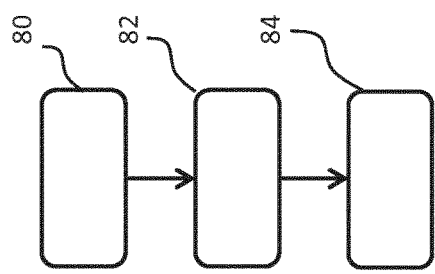
FIG. 7 shows an example of method of the invention.

FIG. 7 shows the method carried out by the controller. The method comprises receiving a new (i.e. second) dimming level, which is different to the currently set (i.e. first) dimming level, in step 80. In step 82 the fade time is set in dependence on both the difference between the first and second dimming levels and the absolute value of at least one of the first and second dimming levels. Note that the absolute value of one dimming value and the change in dimming value defines the other dimming value. Thus, only one absolute value of dimming value is needed by the algorithm, for the algorithm to take account of the general brightness range being output. Generally, the algorithm simply receives the current dimming value and the new dimming value and derives the required fade time from these values. Thus, the difference between the dimming values is an intermediate parameter that may or may not actually be calculated. For example, if FIG. 1 is implemented as a look up table, there is no need at all to calculate the difference in dimming values. Rather, the resulting fade times take account of the difference in the values set by the table.

The light source is controlled in step 84 to adjust the dimming level over the course of the set fade time. This typically involves applying intermediate brightness levels, between those corresponding to the start and end dimming values, with a frequency determined by the internal clock speed of the driver.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "controller". The hardware may include conventional microprocessors, application specific integrated circuits (ASICs), and field-programmable gate arrays (FPGAs).

Furthermore, aspects of the present invention may take the form of a computer program product embodied in any one or more computer readable medium(s) having computer usable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A controller adapted to control a dimmable light source, wherein the controller comprises an input adapted to receive a second dimming level, which is different to a first dimming level to which the light source is set and an output for providing control commands to the light source to control the brightness level over time, wherein the controller is adapted to:
set a fade time over which the light source is to be controlled to adjust the light source output from the first dimming level to the second dimming level, wherein the fade time is selected in dependence on both the difference between the first and second dimming levels and the absolute value of at least one of the first and second dimming levels; and adapted to control the light source to adjust the dimming level over the course of the set fade time.

2. A controller as claimed in claim 1, which is adapted to divide the fade time into a set of fixed time duration segments, and to set dimming levels for each segment.

3. A controller as claimed in claim 2, wherein the controller is adapted to select the dimming levels within the segment to vary:
   linearly over the fade time; or
   non-linearly over the fade time with slower rate of change at lower dimming levels.

4. A controller as claimed in claim 1, which is adapted to set a minimum value of the fade time, wherein the minimum fade time is set if the difference between the first and second dimming levels exceeds a threshold.

5. A controller as claimed in claim 4, which is adapted to set the fade time above the minimum fade time by an amount which depends on the second dimming level and the difference between the first and second dimming levels.

6. A controller as claimed in claim 1, which is adapted to determine an update frequency of the dimming level signal received as input, and to adapt the fade time in dependence on the update frequency.

7. A controller as claimed in claim 1 adapted to control a dimmable solid state light source.

8. A lighting system, comprising:
   an LED luminaire; and
   a controller as claimed in claim 7.

9. A method of controlling a dimmable light source, wherein the light source is set to a first dimming level, the method comprising:

receiving a second dimming level, which is different to the first dimming level;

setting a fade time over which the light source is to be controlled to adjust the light source output from the first dimming level to the second dimming level, wherein the fade time is selected in dependence on both the difference between the first and second dimming levels and the absolute value of at least one of the first and second dimming levels; and controlling the light source to adjust the dimming level over the course of the set fade time.

10. A method as claimed in claim 9, comprising dividing the fade time into a set of fixed time duration segments, and setting dimming levels for each segment.

11. A method as claimed in claim 10, comprising selecting dimming levels for the segments which vary:
   linearly over the fade time; or
   non-linearly over the fade time with slower rate of change at lower dimming levels.

12. A method as claimed in claim 9, comprising setting a minimum value for the fade time, and setting the minimum fade time if the difference between the first and second dimming levels exceeds a threshold.

13. A method as claimed in claim 12, comprising setting the fade time above the minimum fade time by an amount which depends on the second dimming level and the difference between the first and second dimming levels.

14. A method as claimed in claim 9 comprising controlling a solid state light source.

15. A computer program comprising code means which is adapted, when run on a computer, to perform the method of claim 9.

* * * * *